UNITED STATES PATENT OFFICE.

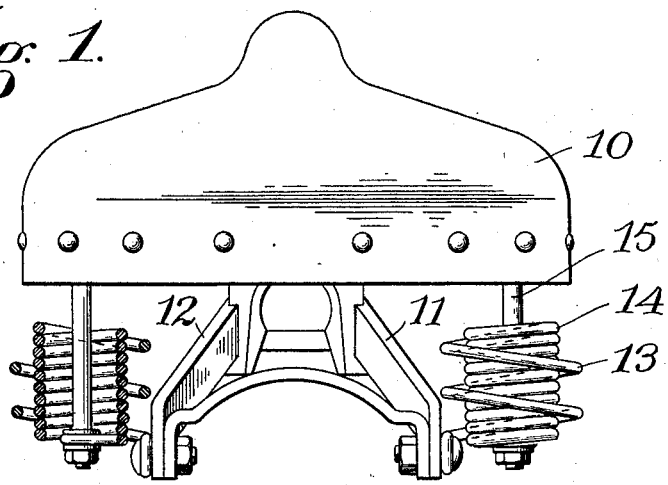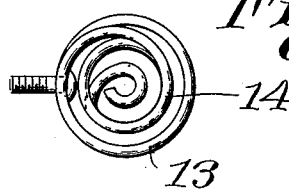

CHARLES A. PERSONS, OF WORCESTER, MASSACHUSETTS.

SPRING-SADDLE.

1,097,361.　　　　　Specification of Letters Patent.　　Patented May 19, 1914.

Application filed March 8, 1913. Serial No. 752,909.

*To all whom it may concern:*

Be it known that I, CHARLES A. PERSONS, a citizen of the United States, residing at Worcester, in the county of Worcester, State of Massachusetts, have invented a certain new and useful Improvement in Spring-Saddles, of which the following is a specification, reference being had therein to the accompanying drawings.

This invention relates to seats for vehicles but more particularly to seats or saddles for velocipedes, bicycles, motorcycles and the like, and has for its object to provide a structure which has greater vibration absorption, resiliency and smoothness of action, and is more compact than any other device of a similar nature heretofore produced.

It is particularly important in saddles that compactness without loss of efficiency be provided on account of the introduction of the spring frame in motorcycles where the seat has a range of vertical movement greater than that found in its own spring support, owing to the rise and fall of a portion of the motorcycle frame. In some cases it is impossible to use a saddle in which the extension springs hang below the saddle as these springs in their extended position come in contact with the frame of the motorcycle to the serious discomfort of the rider.

In the present invention the compression and extension springs are placed preferably above the rear portion of the truss. The upper portion of the preferably closely wound extension springs is integral with the upper portion of the preferably open wound compression spring. Thus the tendency of the weight of the rider is to open the extension springs and at the same time to close the compression springs, and in closing the latter to carry the upper portion of the same downwardly in the direction of the movement of the seat giving the latter great radius of action.

One of the particular features of the invention is the forming of the compression spring and the extension spring of a single piece of wire which has been practically impossible with the forms of compound springs heretofore known. This does away with the joints and connections which have caused so much trouble. While it is advantageous to thus construct the two springs integral, they may be separate and joined if desired.

The many other features and advantages of this invention will be fully understood from the following description and included in the claims.

One embodiment of the invention is shown in the drawings in which:—

Figure 1 is a rear elevation of the invention complete, portions of one of the cantle supports having been cut away to show the interior construction thereof. Fig. 2, detail plan view of one of the cantle supports detached, as will be fully described hereinafter.

Referring to the drawings, the invention comprises a seat 10 mounted upon oppositely disposed trusses or frames 11 and 12. The rear portion of each of these trusses 11 and 12 is connected with the under side of the cantle portion of the seat by resilient cantle supports but, as each of these are the same except that the parts are reversed, only one will be described as the description will apply equally to the other.

The cantle support comprises a compression spring 13 which preferably has its lower extremity secured to the rear portion of the truss. This spring 13 has the coils thereof open wound. Preferably forming a continuation of this compression spring 13 is the extension spring 14 which extends downwardly within the coils of the spring 13. To the lower extremity of the spring 14 is secured the upright rod 15 which preferably extends upwardly within the coils of the extension spring. The upper extremity of this upright rod 15 is secured to the underside of the cantle portion of the seat.

It is advisable to have the coils of the two compression springs wound in opposite directions and similarly with the extension springs. Suitable means are provided for connecting the peak of the seat with the supporting frame.

The applicant is aware that many changes in the construction and arrangement of parts may be made by anyone skilled in the art without departing from the scope of his invention and he does not care to be limited to the particular embodiment herein shown and described.

What I claim as my invention and desire to secure by Letters Patent is:—

1. In a device of the class described, a seat, a supporting frame therefor, and a resilient support interposed between said seat and said frame comprising, a coil extension spring, and a coil compression spring integral with said extension spring, the free end of one of said springs being connected to said seat and the free end of the other spring being connected to said frame.

2. In a device of the class described, a seat, a supporting frame therefor, and a resilient support interposed between said seat and said frame comprising a single piece of wire having one portion thereof forming an extension spring and another portion thereof forming a compression spring, one end of said wire being connected to said seat and the other end to said frame.

3. In a device of the class described, a seat, a supporting frame therefor, and resilient supports interposed between said seat and said frame each comprising a piece of spring wire having one end connected to the supporting frame and the other extremity connected to said seat, the portion of the wire adjacent to one end forming a compression spring and the portion adjacent to the other end forming an extension spring.

4. In a device of the class described, a compound spring support comprising a single piece of spring wire having one portion thereof close wound to form an extension spring and the remaining portion loosely wound about this extension spring to form a compression spring.

In testimony whereof I affix my signature in the presence of two witnesses.

CHARLES A. PERSONS.

Witnesses:
 HARTLEY W. BARTLETT,
 HANNAH M. KENNEDY.

Copies of this patent may be obtained for five cents each, by addressing the "Commissioner of Patents, Washington, D. C."